(12) United States Patent
Caufield et al.

(10) Patent No.: US 9,542,246 B2
(45) Date of Patent: *Jan. 10, 2017

(54) SHARING A PARTITIONED DATA SET ACROSS PARALLEL APPLICATIONS

(71) Applicant: International Business Machines Corporation, Armonk, NY (US)

(72) Inventors: Brian K. Caufield, Livermore, CA (US); Ron E. Liu, San Jose, CA (US); Sriram K. Padmanabhan, San Jose, CA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,495

(22) Filed: May 20, 2015

(65) Prior Publication Data
US 2016/0070608 A1 Mar. 10, 2016

Related U.S. Application Data

(63) Continuation of application No. 14/478,480, filed on Sep. 5, 2014.

(51) Int. Cl.
G06F 9/44 (2006.01)
G06F 9/54 (2006.01)

(52) U.S. Cl.
CPC ..................... *G06F 9/544* (2013.01)

(58) Field of Classification Search
CPC ....................................... G06F 9/544
See application file for complete search history.

(56) References Cited

U.S. PATENT DOCUMENTS

| | | | |
|---|---|---|---|
| 5,475,841 A | 12/1995 | Takahashi | |
| 5,875,464 A | 2/1999 | Kirk | |
| 7,281,104 B1 | 10/2007 | Tsypliaev et al. | |
| 8,271,606 B2 | 9/2012 | Jewett et al. | |
| 8,903,803 B1 * | 12/2014 | Aly | G06F 17/30333 707/713 |
| 8,996,531 B1 * | 3/2015 | Sacco | G06F 12/00 707/741 |
| 9,037,698 B1 * | 5/2015 | Nordstrom | G06F 11/301 707/736 |

(Continued)

OTHER PUBLICATIONS

Mell et al., "Effectively and Securely Using the Cloud Computing Paradigm", dated Oct. 7, 2009, NIST, Information Technology Laboratory, Total 80 pages.

(Continued)

*Primary Examiner* — Andy Ho
*Assistant Examiner* — Abdou Seye
(74) *Attorney, Agent, or Firm* — Janaki K. Davda; Konrad, Raynes, Davda and Victor LLP

(57) ABSTRACT

Provided are techniques for sharing a partitioned data set across parallel applications. Under control of a producing application, a partitioned data set is generated; a descriptor that describes the partitioned data set is generated; and the descriptor is registered in a registry. Under control of a consuming application, the registry is accessed to obtain the descriptor of the partitioned data set; and the descriptor is uses to determine how to process the partitioned data set.

7 Claims, 14 Drawing Sheets

(56) References Cited

U.S. PATENT DOCUMENTS

| | | |
|---|---|---|
| 2008/0140877 A1 | 6/2008 | Baba et al. |
| 2009/0063589 A1* | 3/2009 | Cox .................. G06F 17/30492 |
| 2014/0059052 A1* | 2/2014 | Yamamoto ........ G06F 17/30312 |
| | | 707/741 |
| 2015/0134796 A1 | 5/2015 | Theimer et al. |
| 2015/0193243 A1* | 7/2015 | Varkhedi ................... G06F 9/50 |
| | | 718/1 |

OTHER PUBLICATIONS

Mell et al., "The NIST Definition of Cloud Computing (Draft)", dated Jan. 2011, National Institute of Standards and Technology (NIST), U.S. Department of Commerce, Total 7 pages.

"Partitions, Companies, and Data Isolation in Microsoft Dynamics AX [AX 2012]", dated 2014, (online), retrieved from the Internet at URL>http://msdn.microsoft.com/en-us/library/ij677285.aspx, Total 8 pages.

"Avro's built-in sorting (/2013/05/28/avro-builtinsorting)", dated May 28, 2013, (online) retrieved from the Internet at URL>http://grepalex.com/2013/05/28/avro-builtin-sorting/, Total 8 pages.

"Automatic Data-Driven Partitioning of MVC Applications for On-Demand Edge Computing", An IP.com Prior Art Database Technical Disclosure, IPCOM000032965D, dated Nov. 19, 2004, Total 6 pages.

"Disk Change Block Tracking Using a Separate Partition", dated Jun. 3, 2011, an IP.com Prior Art Database Technical Disclosure, IPCOM000207604D, Total 11 pages.

Ganesan et al., "Online Balancing of Range-Partitioned Data with Applications to Peer-to-Peer Systems", Proceedings of the 30th VLDB Conference, dated 2004, Total 12 pages.

"Partition Magic 8.0 Publisher's Description", dated 2003-2014, Total 2 pages.

G. Jagannathan et al., "Privacy-Preserving Distributed k-Means Clustering Over Arbitrarily Partitioned Data", Research Track Poster, KDD' 05, dated Aug. 21-24, 2005, Total 7 pages.

US Patent Application, for U.S. Appl. No. 14/478,480 (54.125), filed Sep. 5, 2014, invented by Brian K. Caufield et al., Total 44 pages.

Preliminary Amendment, dated May 20, 2015, for U.S. Appl. No. 14/478,480 (54.125), filed Sep. 5, 2014, invented by Brian K. Caufield et al., Total 5 pages.

List of IBM Patents or Patent Applications Treated as Related, Total 2 pages, May 20, 2015.

Office Action, dated Oct. 15, 2015, for U.S. Appl. No. 14/478,480 (54.125), filed Sep. 5, 2014, invented by Brian K. Caufield et al., Total 18 pages.

Response to Office Action, dated Jan. 12, 2016, for U.S. Appl. No. 14/478,480 (54.125), filed Sep. 5, 2014, invented by Brian K. Caufield et al., Total 8 pages.

Final Office Action, dated Apr. 1, 2016, for U.S. Appl. No. 14/478,480 (54.125), filed Sep. 5, 2014, invented by Brian K. Caufield et al., Total 12 pages.

Response to Final Office Action, dated Jun. 22, 2016, for U.S. Appl. No. 14/478,480 (54.125), filed Sep. 5, 2014, invented by Brian K. Caufield et al., Total 10 pages.

Notice of Allowance, dated Jul. 29, 2016, for U.S. Appl. No. 14/478,480 (54.125), filed Sep. 5, 2014, invented by Brian K. Caufield et al., Total 12 pages.

* cited by examiner

| Data Set Properties | Data type | Description |
|---|---|---|
| Count | Integer | The number of files that make up the data set. |
| IsOrdered | Boolean | Indicates whether the order of the partition files matter. |
| Files | Filename, ... | List of files that make up the complete data set. If the partitions are ordered, this list specifies the order of the partitions. |
| FieldDelimiter | String | Character pattern that marks the boundary between records. |
| PartitionMethod | String | 'Balanced' or 'Key' |
| PartitionKeys | List of integer | [Optional] FieldIndex <, FieldIndex, ...> |
| PartitionSorted | Boolean | Indicates whether the data is sorted within each partition. |
| PartitionSortKeys | String | [Optional] FieldIndex <, FieldIndex, ...> |

FIG. 3

```
// after sorting the data, write the partitioned data set to file system

// connect to the database and update the registry table connect to abc_db;
INSERT INTO DP_REGISTRY
VALUES
(
  'iishd010.svl.ibm.com:8080/data/controller/dfs/OC',
  'option_code',
  4,
  'T',
'/OC/option_code.part001,/OC/option_code.part002,/OC/option_code.part003,/OC/option_code.part004',
  '|',
  'Key',
  1,
  'T',
  1
);
commit;
connect reset;
// phase 1 is completed.
```

FIG. 6

```
// First retrieve the data partitioning information from the registry connect to abc_db;

SELECT Count, IsOrdered, Files, FieldDelimiter, PartitionMethod, PartitionKeys,
PartitionSorted, PartitionSortKeys
FROM
DP_REGISTRY
WHERE
DataSourceName = 'iishd010.svl.ibm.com:8080/data/controller/dfs/OC',
AND
DataSetName = 'option_code';

// if the row exists, use the information to assemble the partitioned data descriptor // proceed to next steps
```

| Data Set Properties | Data type |
|---|---|
| Count | 4 |
| IsOrdered | T |
| Files | /OC/option_code.part001<br>/OC/option_code.part002<br>/OC/option_code.part003<br>/OC/option_code.part004 |
| FieldDelimiter | \| |
| PartitionMethod | Key |
| PartitionKeys | 1 |
| PartitionSorted | T |
| PartitionSortKeys | 1 |

FIG. 8

| Data Set Properties | Data type |
|---|---|
| Count | 4 |
| IsOrdered | T |
| Files | /OC/option_code.part001<br>/OC/option_code.part002<br>/OC/option_code.part003<br>/OC/option_code.part004 |
| FieldDelimiter | \| |
| PartitionMethod | Balanced |
| PartitionKeys | 1 |
| PartitionSorted | T |
| PartitionSortKeys | 1 |

FIG. 10

SHARING A PARTITIONED DATA SET ACROSS PARALLEL APPLICATIONS

FIELD

Embodiments of the invention relate to sharing a partitioned data set across parallel applications.

BACKGROUND

With the ever increasing amount of data available to be processed and analyzed and the availability of multi-processor (e.g., Central Processing Unit (CPU)) core systems, more and more data processing applications are being built to process data using parallel data processing techniques. A common technique for processing data in parallel is to partition data into subsets and run many instances of the application's processes or threads to operate on the subsets simultaneously (i.e., in parallel).

Often, the data that was created in one parallel processing system is moved to, or through, one or more other parallel processing systems. In the current state of art, these parallel processing systems typically do their parallel processing in a proprietary manner and interface with other parallel processing systems using a "lowest-common-denominator" type of approach. With such an approach, the first application partitions the data in a first manner (e.g., into 4 partitions), then, the data is serialized and written to a sequential file on disk or passed through a sequential Application Programming Interface (API) to the second application, and the second application re-partitions the data in a second manner (e.g., into 2 partitions). This interaction between parallel processing systems introduces bottlenecks into the overall processing of the data, reducing the benefits gained by using these parallel processing systems.

Some products in the market have developed special functionality to improve on this. For example, one implementation works if the data is moving from application A to application B, but, different implementations are needed to move data from application B to application A or from application A to application C. Thus, when specific functionality is added to allow for parallel data exchange, each interaction is a one-off/custom implementation.

The following example is provided to clarify existing solutions. This example has a set of records forming data. For example, in a data integration scenario, a job is designed to get a two letter option code of each record to a single line for all the records with the same key. First the records are sorted. Then, a task loops through each subgroup of records (grouped by the key), extracts the option code of each of the records, and concatenates the option codes into a single line.

When there are a large number of records, a first application (e.g., an Apache Hadoop® application or a JavaScript® Object Notation (JSON) Query Language (JAQL) application) may be used to perform the sort, while a second application (e.g., an Extract, Transform and Load (ETL) application) is used to perform the looping and option code extraction. (Apache Hadoop is a registered trademark of the Apache Software Foundation in the United States and/or other countries. JavaScript is a registered trademark of Oracle Corporation in the United States and/or other countries.) In processing, the output of the first application will be used as the input for the second application.

To process the records in parallel, the first application partitions the records. For example, the first application partitions the records in n ways, while the second application partitions the records in m ways. The second application reads n streams of input records from the first application. Thus, the second application expects n streams of records from the first application and assumes the records are sorted. The second application does not rely on any constraint or correlation between the n streams. The second application runs m instances of the job (m ways of data partitioning) against the n streams of records generated by the first application.

Although, a typical data set has a large number of records, the following example has been simplified with a small data set for illustration to enhance understanding, while avoiding the complexities of processing a large number of records. The records to be processed include a key, the option code, and other fields. For simplicity, two fields, the key and the option code field, are used to describe this example. The simplified sample data (without showing the large volume) looks like the following.

| Key | Option Code |
|-----|-------------|
| 3   | TM          |
| 3   | ET          |
| 1   | CD          |
| 1   | EF          |
| 2   | DB          |
| 3   | FG          |
| 3   | LO          |
| 3   | PM          |
| 3   | WZ          |
| 4   | BW          |
| 5   | SV          |
| 3   | FV          |
| 3   | RH          |
| 1   | AB          |
| 6   | MU          |

For this example, assume that the first application partitions the records in 4 ways (n=4) and that the second application partitions the records in 2 ways (m=2).

In phase 1 of the processing, the first application sorts the records. In the above example data, there is skew in the data (there are many rows with the key of 3), but the skew is not manifesting itself in an imbalance because the skewed data is spread over a number of reducers (in a map/reduce system). The following shows the output of the first application with each of the partitions of sorted records:

| Partition 1 | |
|---|---|
| Key | Option Code |
| 1 | AB |
| 1 | CD |
| 1 | EF |
| 2 | DB |

| Partition 2 | |
|---|---|
| Key | Option Code |
| 3 | ET |
| 3 | FG |
| 3 | FV |
| 3 | LO |

| Partition 3 | |
| --- | --- |
| Key | Option Code |
| 3 | PM |
| 3 | RH |
| 3 | TM |
| 3 | WZ |

| Partition 4 | |
| --- | --- |
| Key | Option Code |
| 4 | BW |
| 5 | SV |
| 6 | MU |

In phase 2 of the processing, the second application receives the partitioned records and loops through each sorted group of records to extract and concatenate the option codes. In this example, the second application runs in 2 ways, getting records output by the first application in two streams. Stream A gets partition 1 and partition 3 records, while stream B gets partition 2 and partition 4 records. Then, the second application generates the following results:

| Key | All Option Codes |
| --- | --- |
| 1 | AB CD EF |
| 2 | DB |
| 3 | ET FG FV LO |
| 3 | PM RH TM WZ |
| 4 | BW |
| 5 | SV |
| 6 | MU |

However, the result is not correct. The correct result should not have one key spread across more than one row (i.e., there are two rows for key 3). The correct result should look like the following:

| Key | All Option Codes |
| --- | --- |
| 1 | AB CD EF |
| 2 | DB |
| 3 | ET FG FV LO PM RH TM WZ |
| 4 | BW |
| 5 | SV |
| 6 | MU |

Because there is no sharing of information about data between applications, passing parallel data from one parallel processing application to another parallel processing application often results in serializing the data and forcing sequential processing by both applications.

If applications make an attempt to take advantage of existing data partitioning, assumptions may be made about the partitioning characteristics, which may lead to errors.

SUMMARY

Provided is a method for sharing a partitioned data set across parallel applications. The method, comprises, under control of a producing application, generating a partitioned data set; generating a descriptor that describes the partitioned data set; and registering the descriptor in a registry; and, under control of a consuming application, accessing the registry to obtain the descriptor of the partitioned data set; and using the descriptor to determine how to process the partitioned data set.

Provided is a computer program product for sharing a partitioned data set across parallel applications. The computer program product comprises a computer readable storage medium having program code embodied therewith, the program code executable by at least one processor to perform: under control of a producing application, generating a partitioned data set; generating a descriptor that describes the partitioned data set; and registering the descriptor in a registry; and, under control of a consuming application, accessing the registry to obtain the descriptor of the partitioned data set; and using the descriptor to determine how to process the partitioned data set.

Provided is a computer system for sharing a partitioned data set across parallel applications. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: under control of a producing application, generating a partitioned data set; generating a descriptor that describes the partitioned data set; and registering the descriptor in a registry; and, under control of a consuming application, accessing the registry to obtain the descriptor of the partitioned data set; and using the descriptor to determine how to process the partitioned data set.

BRIEF DESCRIPTION OF THE SEVERAL VIEWS OF THE DRAWINGS

Referring now to the drawings in which like reference numbers represent corresponding parts throughout:

FIG. 3 illustrates a descriptor in accordance with certain embodiments.

FIG. 6 illustrates pseudo code for storing a descriptor of a partitioned data set into a registry in accordance with certain embodiments.

FIG. 7 illustrates pseudo code for retrieving a descriptor of a partitioned data set from a registry in accordance with certain embodiments.

FIG. 8 illustrates a descriptor of a partitioned data set in accordance with certain embodiments.

FIG. 10 illustrates a descriptor of data for balanced partitioning in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
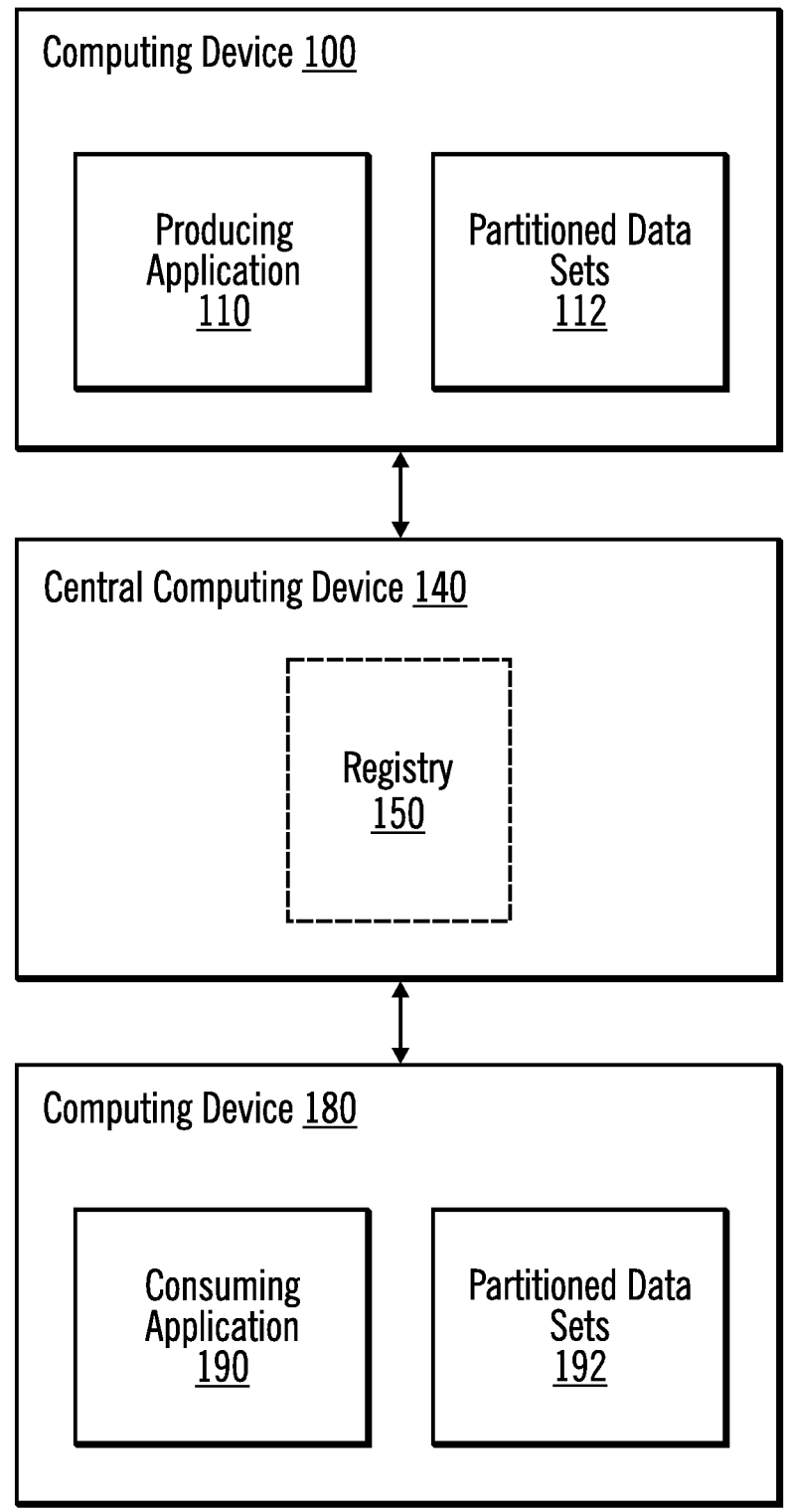
FIG. 1 illustrates, in a block diagram, a computing environment in accordance with certain embodiments.

FIG. 1 illustrates, in a block diagram, a computing environment in accordance with certain embodiments. A computing device 100 is coupled to a computing device 140. The computing device 140 is coupled to computing device 180. In certain embodiments, the computing devices 100, 140, 180 are server computers. The computing device 100 includes a producing application 110 and partitioned data sets 112 that includes records. The computing device 140 includes a registry 150. The computing device 180 includes a consuming application 190 and partitioned data sets 192.

The producing application 110 (also referred to as a producer application) may be described as a first application that "produces" or outputs data (one or more partitioned data sets 112), while the consuming application 190 (also referred to as a consumer application) may be described as a second application that "consumes" or processes the data (the one or more partitioned data sets 112) output by the first application 110. Also, the producing application 110 may be said to be upstream from the consuming application 190, and the consuming application 190 may be said to be downstream from the producing application 110.

Although one producing application and one consuming application are shown, there may be any number of producing applications and/or consuming applications processing the data (the one or more partitioned data sets 112). Also, although three computing devices 110, 140, 180 are shown, there may be any number of computing devices coupled to each other that access the registry 150 and process the partitioned data sets 112.

In addition, although the registry 150 is shown at a central computing device 140, in various embodiments, the registry 150 may be located at the computing device 100 executing the producing application 110 or at the computing device 180 executing the consuming application 190. In certain embodiments, the producing application 110, the consuming application 190, and the registry 150 may be located at one computing device.

In certain embodiments, the number of partitioned data sets output by the producing application 110 is different from the number of partitioned data sets 192 used by the consuming application 190. In certain embodiments, the producing application 110 obtains the original data set from another computing device and performs processing to generate the partitioned data set 112.

With embodiments, when handling partitioned data sets across multiple applications, the data set partition information is stored in the registry 150 and provided to and understood by the downstream consuming applications that will use that information and take actions accordingly (e.g., to use the data as it is partitioned, without serializing the data into a file and re-partitioning the data). In certain embodiments, the registry 150 may also store other useful information (e.g., case sensitivity or collation for specific languages as applications may sort or compare strings by default using different case sensitivity or different language specific collation order or equality).

Embodiments allow a producing application to describe parallel data sets that it creates, enabling consuming applications to understand the characteristics of the data set and to use information to reliably take advantage of the partitioning of the data set.

The registry 150 provides a shared directory of partitioned data sets and associated descriptors. In certain embodiments, there is one descriptor for each partitioned data set. A descriptor has a set of properties that are used for understanding the associated partitioned data set. The registry 150 is used by producing applications that are producing partitioned data sets to publish or share information about the data set. Similarly, consuming applications that consume partitioned data sets read the information from the registry to understand the structure of the partitioned data sets. In certain embodiments, the registry 150 provides an API for both producing applications and consuming applications to interface with the registry 150. This creates an environment in which producing applications and consuming applications do not need to be closely integrated to enable efficient processing of partitioned data sets by both applications.

Figure 2:
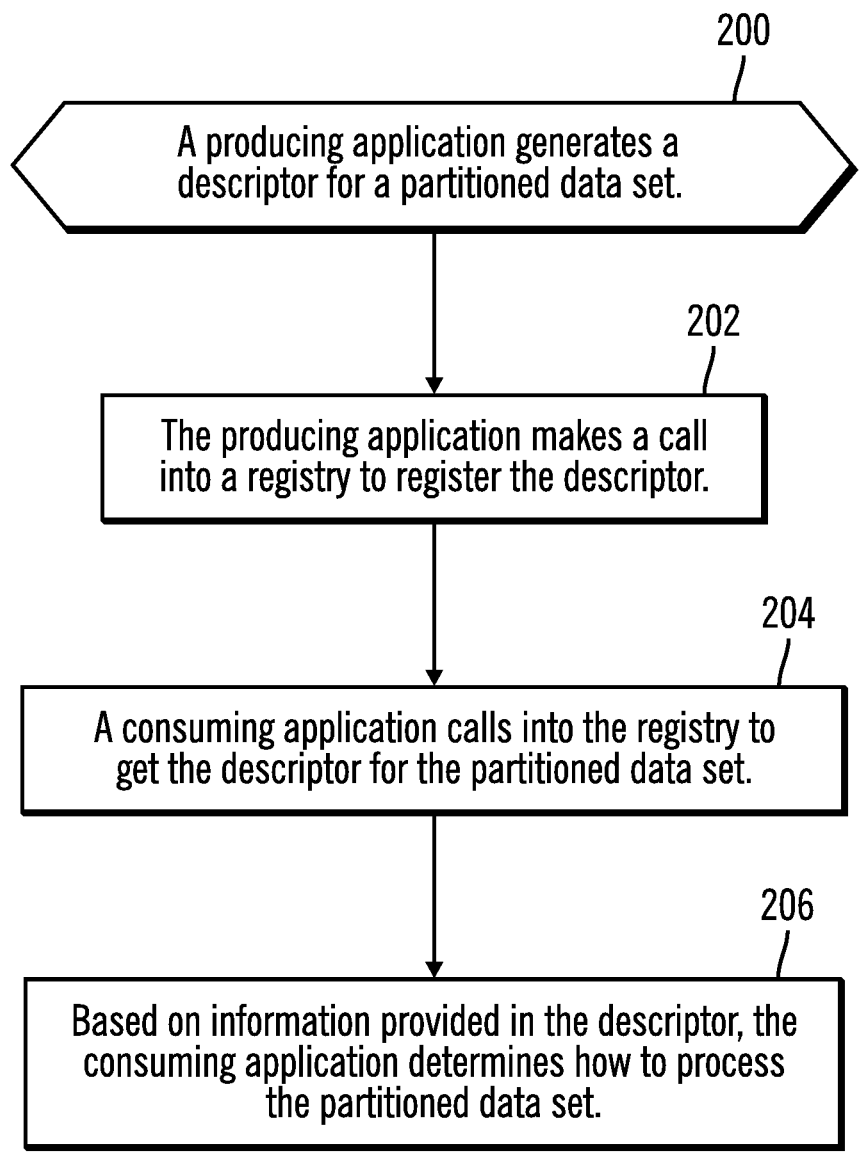
FIG. 2 illustrates, in a flow diagram, operations for using a registry in accordance with certain embodiments.

FIG. 2 illustrates, in a flow diagram, operations for using the registry 150 in accordance with certain embodiments. Control begins at block 200 with a producing application generating a descriptor for a partitioned data set. In block 202, the producing application makes a call into the registry 150 to register the descriptor. In certain embodiments, the producing application does this by passing the descriptor to the registry (e.g., via an API). In block 204, a consuming application calls into the registry 150 to get the descriptor for the partitioned data set (e.g., to read the partitioned data set). In block 206, based on information provided in the descriptor, the consuming application determines how to process the partitioned data set (i.e., makes decisions on what it needs to do to process the partitioned data set).

FIG. 3 illustrates a descriptor 300 in accordance with certain embodiments. In certain embodiments, the descriptor 300 is a table. The producing application creates a partitioned data set and creates a descriptor 300 that captures properties that may be used by consuming applications to understand the characteristics of the partitioned data set (e.g., for use in optimizing access to the partitioned data set). In certain embodiments, the descriptor 300 has the following properties: Count (which describes the number of files that make up the data set), IsOrdered (which indicates whether the order of the partitioned files matters), Files (which is a list of files that make up the complete data set), FieldDelimiter (which is a character pattern that marks the boundary between the records in the partitioned data set), PartitionMethod (which indicates balanced partitioning, key partitioning, or another form of partitioning), PartitionKeys (which is an optional property identifying partition keys), PartitionSorted (which indicates whether the data is sorted within each partition), and PartitionSortKeys (which is an optional property identifying sort keys).

In different embodiments, various formats may be used to represent the descriptor, e.g. property-value list, eXtensible Markup Language (XML), Structured Query Language (SQL) table, etc.

Figure 4:
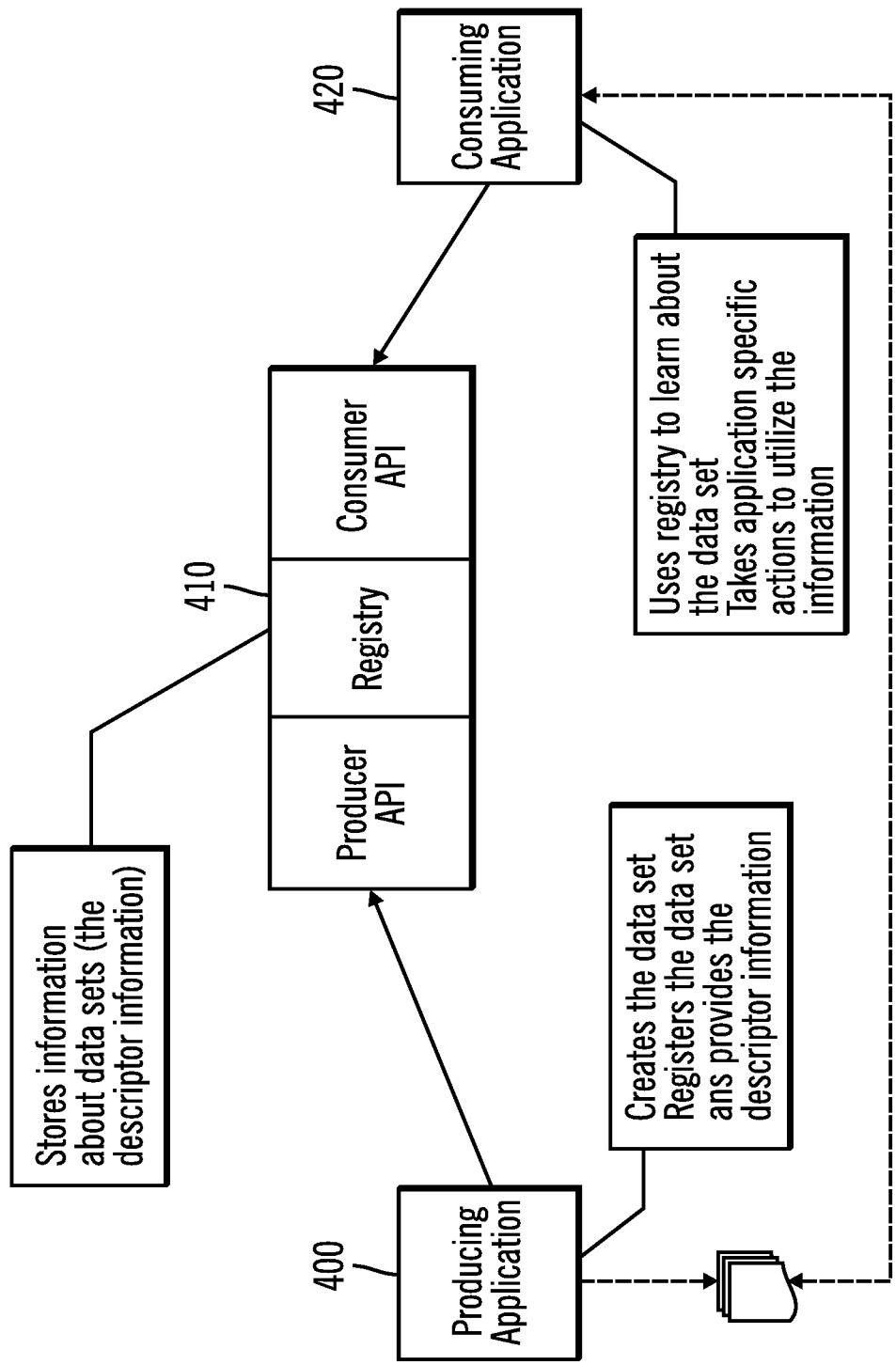
FIG. 4 illustrates an architectural view of sharing a partitioned data set across parallel applications in accordance with certain embodiments.

FIG. 4 illustrates an architectural view of sharing a partitioned data set across parallel applications in accordance with certain embodiments. The producing application 400 uses a producer API to call into the registry 410 to store a descriptor of the partitioned file and provides an identifier for a partitioned file. In certain embodiments, the producing application 400 uses the location of the partitioned file (e.g., Uniform Resource Identifier (URI)) to create a unique identifier for the partitioned data set. In certain embodiments, the registry 410 stores the location of the partitioned file with the unique identifier for the partitioned data set and with the properties of the partitioned data set.

The consuming application 420 that is about to read the partitioned data set calls into the registry 410 using the consumer API. The consuming application 420 provides the URI and the name of the partitioned data set that it will be reading via the consumer API, and the registry 410 provides the descriptor to the consuming application 420. The consuming application may make decisions with application logic on how to take best advantage of the partitioned data set's structure. The consuming application knows the URI (e.g., knows that the full path is a file system or a connect string to a database, etc.).

Embodiments enable parallel processing applications to take advantage of partitioned data sets created by any application, without the applications being tightly coupled.

In various embodiments, the registry may be in a database, a file system, or some other type of repository. Using APIs to call into the registry insulates both the producing application 110 and the consuming application 190 from the registry implementation detail.

In certain embodiments, the API used by the producing application 110 to register the descriptor is:
int registerDescriptor (URI uri, String datasetname, Descriptor descriptor)

In certain embodiments, the API used by the consumer to retrieve the descriptor is:
Descriptor retrieveDescriptor (URI uri, String datasetname)

With embodiments, the registry is managed so that data is in-sync across the producing application, the consuming application, and the registry itself.

Merely to enhance understanding of embodiments, and example is provided herein. However, embodiments are not intended to be limited to this example.

With this example, a database is used to host the registry. The following is the schema of the table that stores the descriptor information:

```
CREATE TABLE DP_REGISTRY
(
    DataSourceName varchar(1000) not null,
    DataSetName varchar(128) not null,
    Count smallint not null,
    isOrdered char(1), -- 'T' for true and 'F' for FALSE
    Files varchar(32000), -- files are delimited by comma
    FieldDelimiter char(1),
    PartitionMethod varchar(20) not null,
    PartitionKeys smallint not null,
    PartitionSorted char(1) not null, -- 'T' for true and 'F' for FALSE
    PartitionSortKeys smallint not null
);
```

The columns of the table are: DataSourceName, DataSetName, Count, isOrdered, Files, FieldDelimiter, PartitionMethod, and PartitionSorted.

The DataSourceName column stores the URI of the partitioned files (e.g., iishd010.svl.ibm.com:8080/data/controller/dfs/OC). The DataSetName column stores the identifier of the data set to be consumed (e.g. "option_code"). The Count column stores the number of partitions of the data set.

If each record in each partition is sorted, the isOrdered column indicates whether the numbering of the partitions reflects the order of the sorted records in the whole data set. That is, if isOrdered is true, a whole sorted data set may be created by concatenating partition 1, partition 2, partition 3, etc.

If the data are written in files, the Files column stores the full path file names, delimited with commas. If the data are in sequential files, the FieldDelimiter column stores the field delimiter between the records. The PartitionMethod column stores how the data is partitioned (e.g., by Key or Balanced). The PartitionSorted column indicates whether data is sorted in each partition. Note that this example does not use the optional PartitionKeys and PartitionSortKeys properties of the descriptor 300.

In this example, a data integration scenario involves two applications, a producing application and a consuming application. This example focuses on how the producing application generates and then stores the data partitioning information in the registry, and how the consuming application retrieves the information from the registry and uses the information to make informed decisions.

Figure 5:
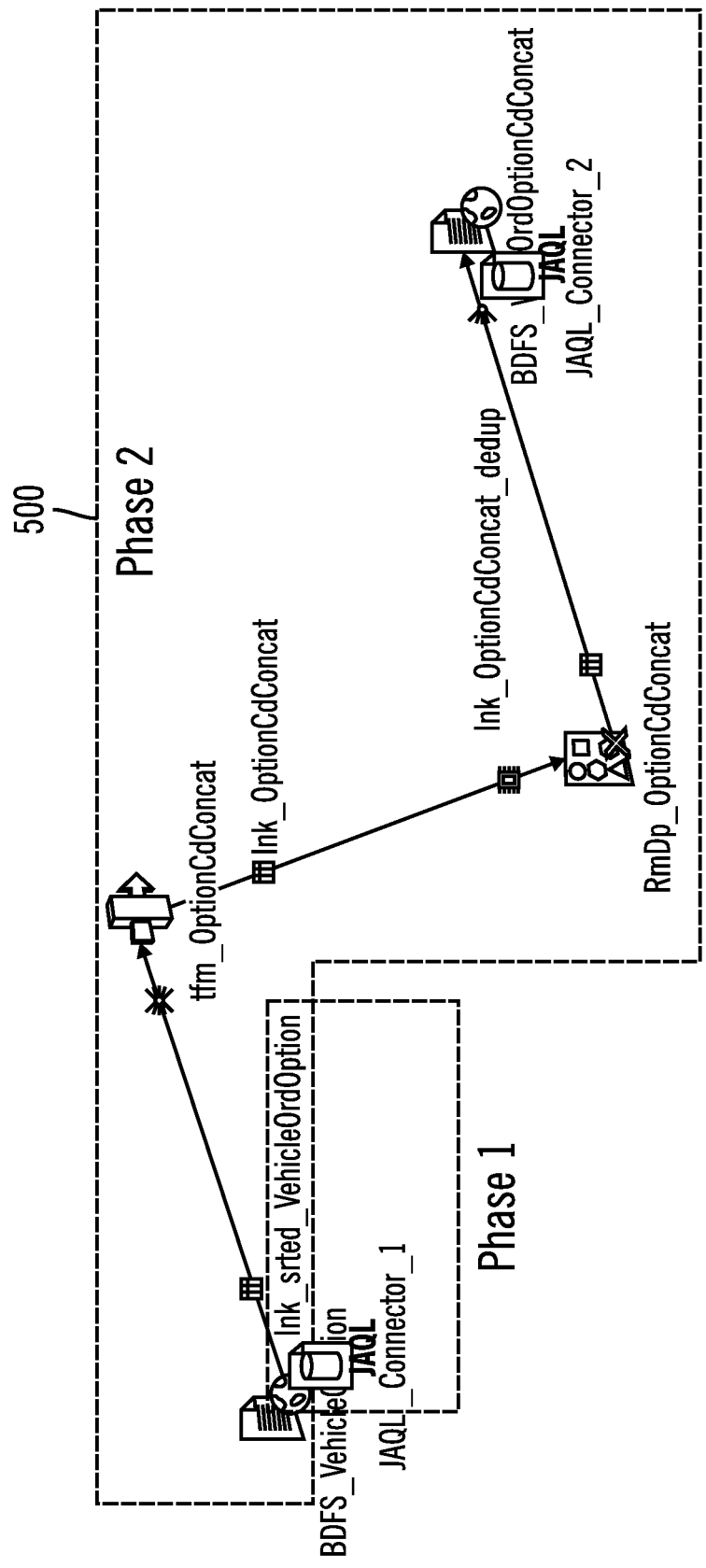
FIG. 5 illustrates a sequence of operations for data integration processing in accordance with embodiments.

To simplify the example, the operations are divided in two phases: phase 1 (sorting the data with the producing application) and phase 2 (extracting/concatenating option codes with the consuming application, followed by additional processing). FIG. 5 illustrates a sequence of operations for data integration processing 500 in accordance with embodiments. The producing application may be any application that can invoke and orchestrate a sequence of operations across multiple applications.

In this example, in phase 1, the producing application may invoke JAQL (a high level language for invoking Map/Reduce jobs to carry out the tasks) using a JAQL connector to sort the data. The results of sorting may be placed in a file system (e.g., an Apache Hadoop® File System (HDFS)). When sorting is complete, the results are partitioned data files that are stored in the file system. In addition, the producing application generates and stores a descriptor (with the data partitioning information) in the registry. FIG. 6 illustrates pseudo code 600 for storing a descriptor of a partitioned data set into a registry in accordance with certain embodiments.

With this example, once phase 1 is completed, phase 2 starts. First the consuming application queries the registry and retrieves the descriptor. Then, the consuming application retrieves the sorted data from the file system and extracts and concatenates the option codes, with further processing in phase 2. With embodiments, the consuming application uses the information in the descriptor to decide on how to process the data. FIG. 7 illustrates pseudo code 700 for retrieving a descriptor of a partitioned data set from a registry in accordance with certain embodiments.

Merely to enhance understanding of embodiments, the following examples of data partitioning methods are provided. However, embodiments are not intended to be limited to these examples.

With the first example, the partitioning method is 'Key' partition. In this example, the data partitioning method is 'Key'. FIG. 8 illustrates a descriptor 800 of a partitioned data set in accordance with certain embodiments. As shown in the descriptor 800, the data is partitioned in 4 ways; the partitioned data are ordered so partition 1 comes first and partition 2 comes second and so on; the data are written to 4 files, each corresponding to a partition; the field delimiter is the character '|'; the partitioning method is 'Key'; the partitioning key is column 1; the data in each partition is sorted; and the data in each partition is sorted by column 1.

Figure 9:
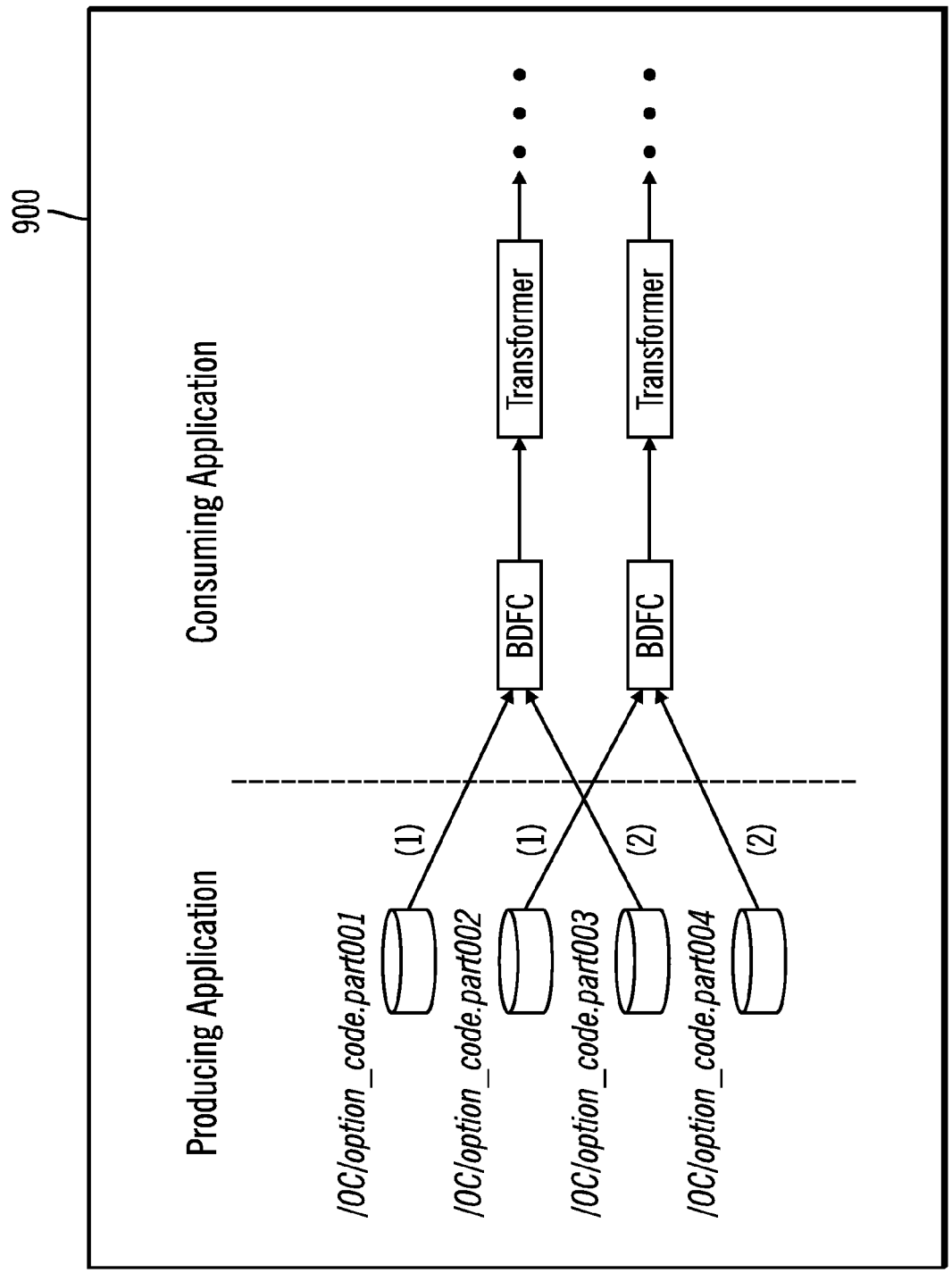
FIG. 9 illustrates an architecture for passing a partitioned data set between a producing application and a consuming application, where the partition method is 'Key', in accordance with certain embodiments.

FIG. 9 illustrates an architecture 900 for passing a partitioned data set between a producing application and a consuming application, where the partition method is 'Key', in accordance with certain embodiments. Based on the information in the descriptor 800, the data that was written by the producing application to the file system are already partitioned by 'Key'. That means the rows with the same key are not spread across multiple partitions. The consuming application starts two running instances of Big Data File Connector (BDFC) to read in parallel. In particular, the consuming application reads 1 partition of data per BDFC instance at a time, in the order as marked by 1 and 2 in FIG. 9. Since the rows with the same key are in the same data partition, the consuming application loops through the rows, extracts the option code of the rows, and groups (i.e., concatenates) the option codes by the key. This example shows that with the information in the descriptor 800, the downstream consuming application may fully leverage the partitioned data generated by the upstream application, with no need for sorting or data re-partitioning. The output of the BDFC instances act as input to Transformers.

With the second example, the partitioning method is "Balanced" partitioning. FIG. 10 illustrates a descriptor 1000 of data for balanced partitioning in accordance with certain embodiments. As shown in the descriptor 1000, the data is partitioned in 4 ways; the partitioned data are ordered so partition 1 comes first and partition 2 comes second and so on; the data are written to 4 files, each corresponding to a partition; the field delimiter is the character '|'; the partitioning method is 'Balanced'; the partitioning key is column 1; the data in each partition is sorted; and the data in each partition is sorted by column 1.

Figure 11:
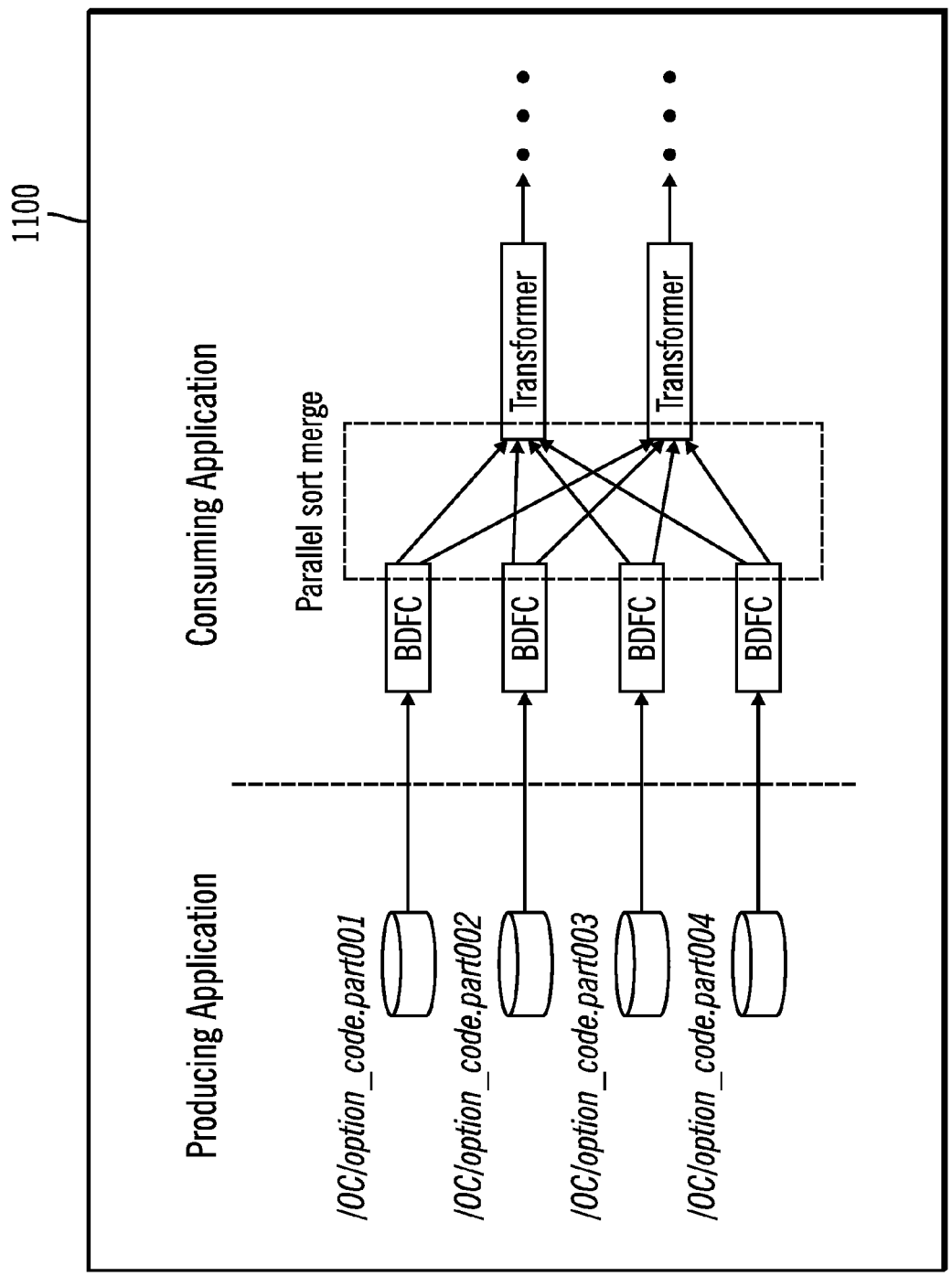
FIG. 11 illustrates an architecture for passing a partitioned data set between a producing application and a consuming application, where the partition method is "Balanced", in accordance with certain embodiments.

FIG. 11 illustrates an architecture 1100 for passing a partitioned data set between a producing application and a consuming application, where the partition method is 'Balanced', in accordance with certain embodiments. Since the data partition method is 'Balanced', the cardinality of the partitions is roughly equal, but rows with the same keys may be split across multiple partitions. In phase 2 processing, the consuming application takes corresponding actions to accommodate the 'Balanced' partition method.

Based on the data partitioning information in the descriptor 1000, when the producing application partitions the data, the producing application also tries to avoid data skew. That is, if there are too many rows with the same key, some of these rows may be spilled to the next partition. So the partitioned data that the producing application writes to the file system may have rows with the same key spread across more than 1 partition. When the consuming application reads in that data, based on the descriptor 1000, the consuming application starts 4 Big Data File Connector (BDFC) instances, each retrieving rows from a different partition. When the BDFC instances send the data to the downstream Transformer stage, the consuming application applies the parallel sort merge function to ensure that the data will go to the right partition. Note, this process does not require the data to be sorted again. With the information in the data descriptor, the downstream consuming application leverages the sorted data by its upstream producing application (i.e., by applying a parallel sort merge function).

Thus, embodiments provide a simple way for parallel applications to share partitioned data sets in such a way that multiple applications may process the data in a more efficient manner.

The descriptor defines the properties that are used by other applications to understand the partitioned data sets and creates a standard 'contract' between producing and consuming applications. The descriptor is stored in a registry where the data partition information may be added (or updated) and retrieved by the producer and consuming applications via APIs. This allows for applications to build efficient mechanisms for processing partitioned data sets, without having to build special one-off implementations for each producer/consumer pair. The registry provides a common directory of partitioned data sets where applications can share and obtain the properties of data sets.

In certain alternative embodiments, a pluggable framework is used such that a plug-in may be implemented by the consuming application to understand the data partitioning information of the partitioned data sets generated by the producing application. With this approach, a plug-in is implemented for each different kind of data source rather than storing information in the registry. For example, in a data integration environment with heterogeneous data sources, multiple plug-ins are implemented and managed.

Embodiments allow applications that share partitioned data sets with a way to propagate partition information so that the applications can process the data optimally. In particular, embodiments use a common registry and APIs to allow applications to share metadata describing partitioned data sets.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 12:
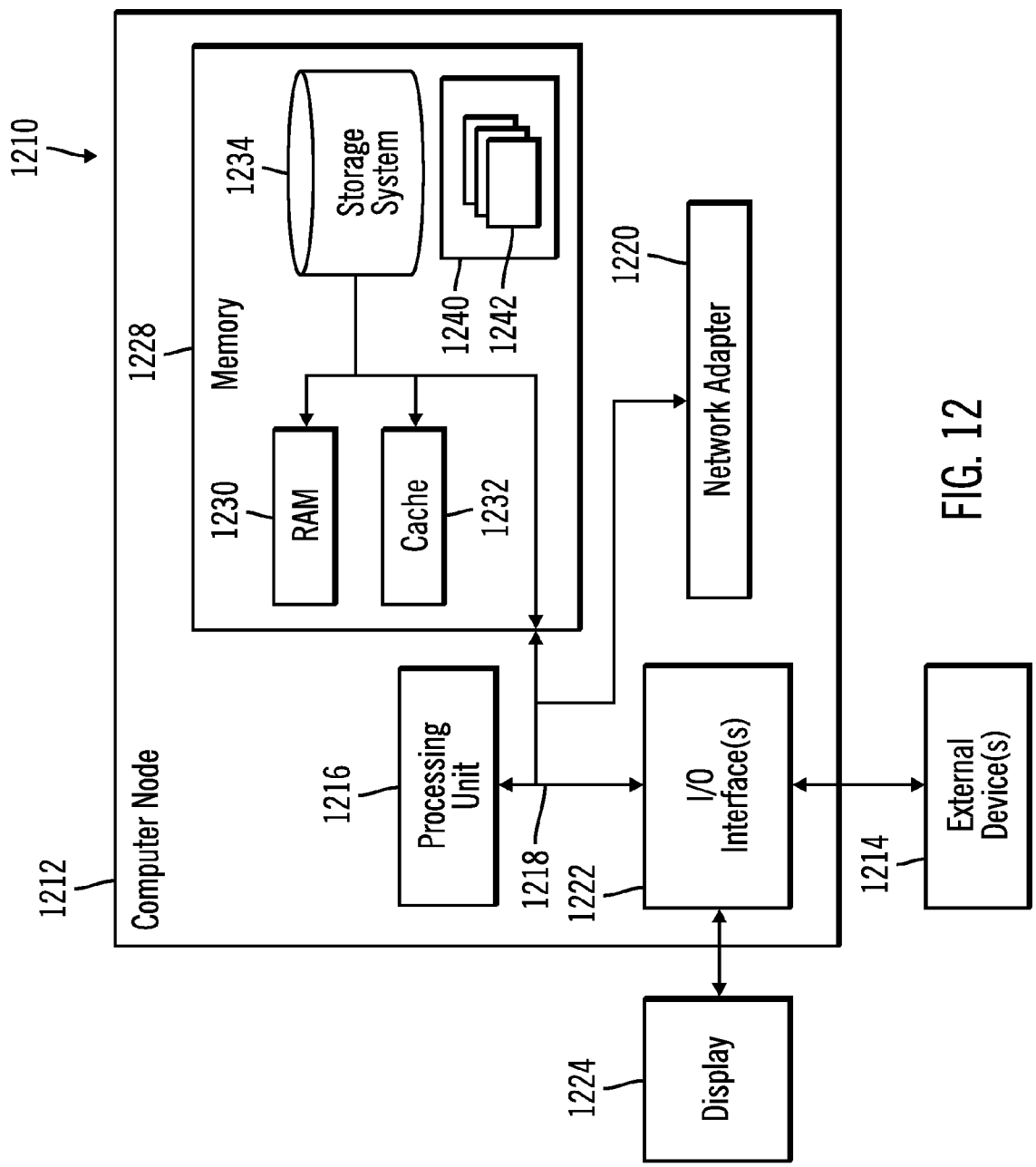
FIG. 12 illustrates a cloud computing node in accordance with certain embodiments.

Referring now to FIG. 12, a schematic of an example of a cloud computing node is shown. Cloud computing node 1210 is only one example of a suitable cloud computing node and is not intended to suggest any limitation as to the scope of use or functionality of embodiments of the invention described herein. Regardless, cloud computing node 1210 is capable of being implemented and/or performing any of the functionality set forth hereinabove.

In cloud computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in cloud computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1212 typically includes a variety of computer system readable media. Such media may be any available media that is accessible by computer system/server 1212, and it includes both volatile and non-volatile media, removable and non-removable media.

System memory 1228 can include computer system readable media in the form of volatile memory, such as random access memory (RAM) 1230 and/or cache memory 1232. Computer system/server 1212 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, memory 1228 may include at least one program product having a set (e.g., at least one) of program modules that are configured to carry out the functions of embodiments of the invention.

Program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc.; one or more devices that enable a user to interact with computer system/server 1212; and/or any devices (e.g., network card, modem, etc.) that enable computer system/server 1212 to communicate with one or more other computing devices. Such communication can occur via Input/Output (I/O) interfaces 1222. Still yet, computer system/server 1212 can communicate with one or more networks such as a local area network (LAN), a general wide area network (WAN), and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples, include, but are not limited to: microcode, device drivers, redundant processing units, external disk drive arrays, RAID systems, tape drives, and data archival storage systems, etc.

Figure 13:
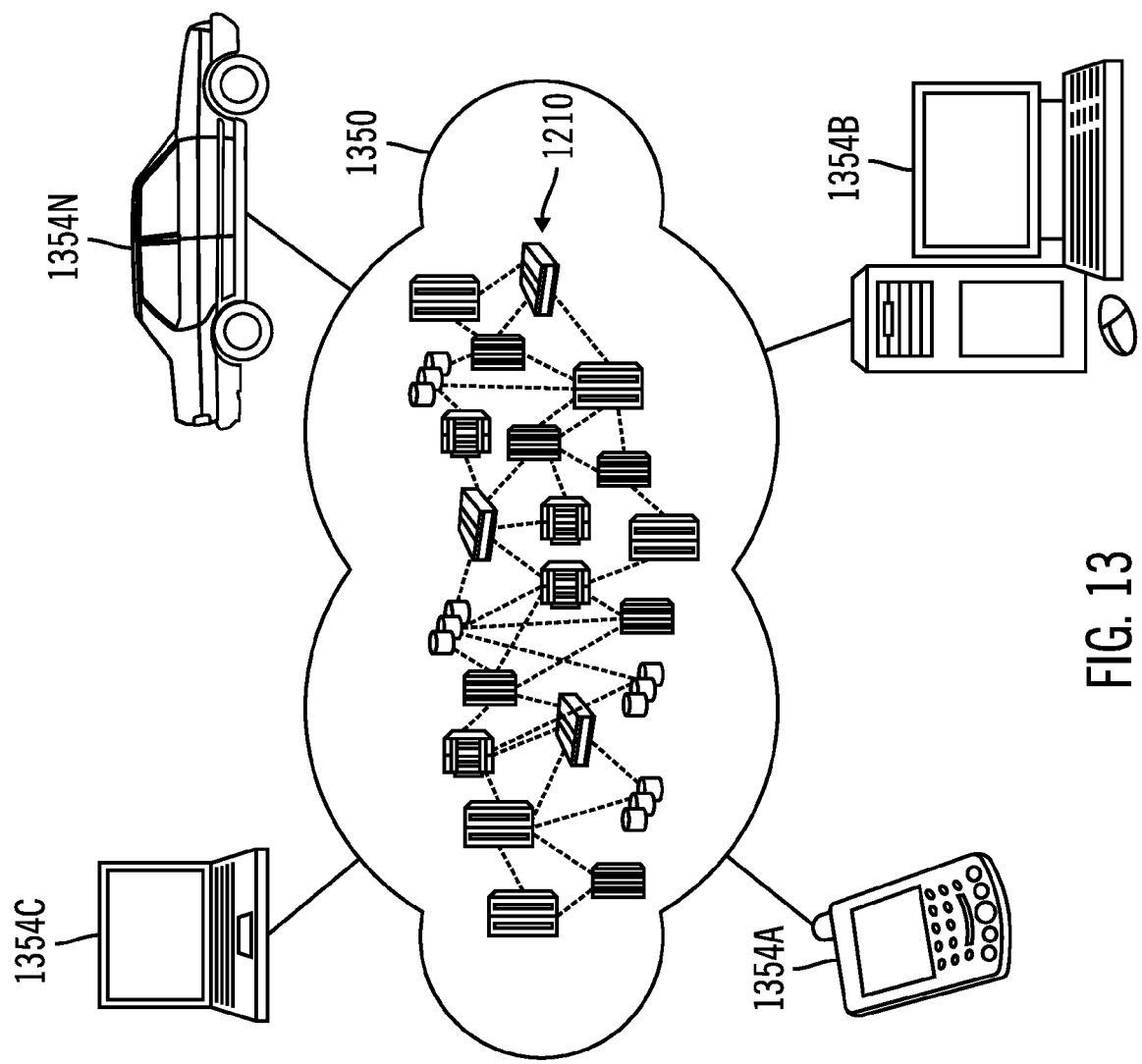
FIG. 13 illustrates a cloud computing environment in accordance with certain embodiments.

Referring now to FIG. 13, illustrative cloud computing environment 1350 is depicted. As shown, cloud computing environment 1350 comprises one or more cloud computing nodes 1210 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1210 and cloud computing environment 1350 can communicate with any type of computerized device over any type of network and/or network addressable connection (e.g., using a web browser).

Figure 14:
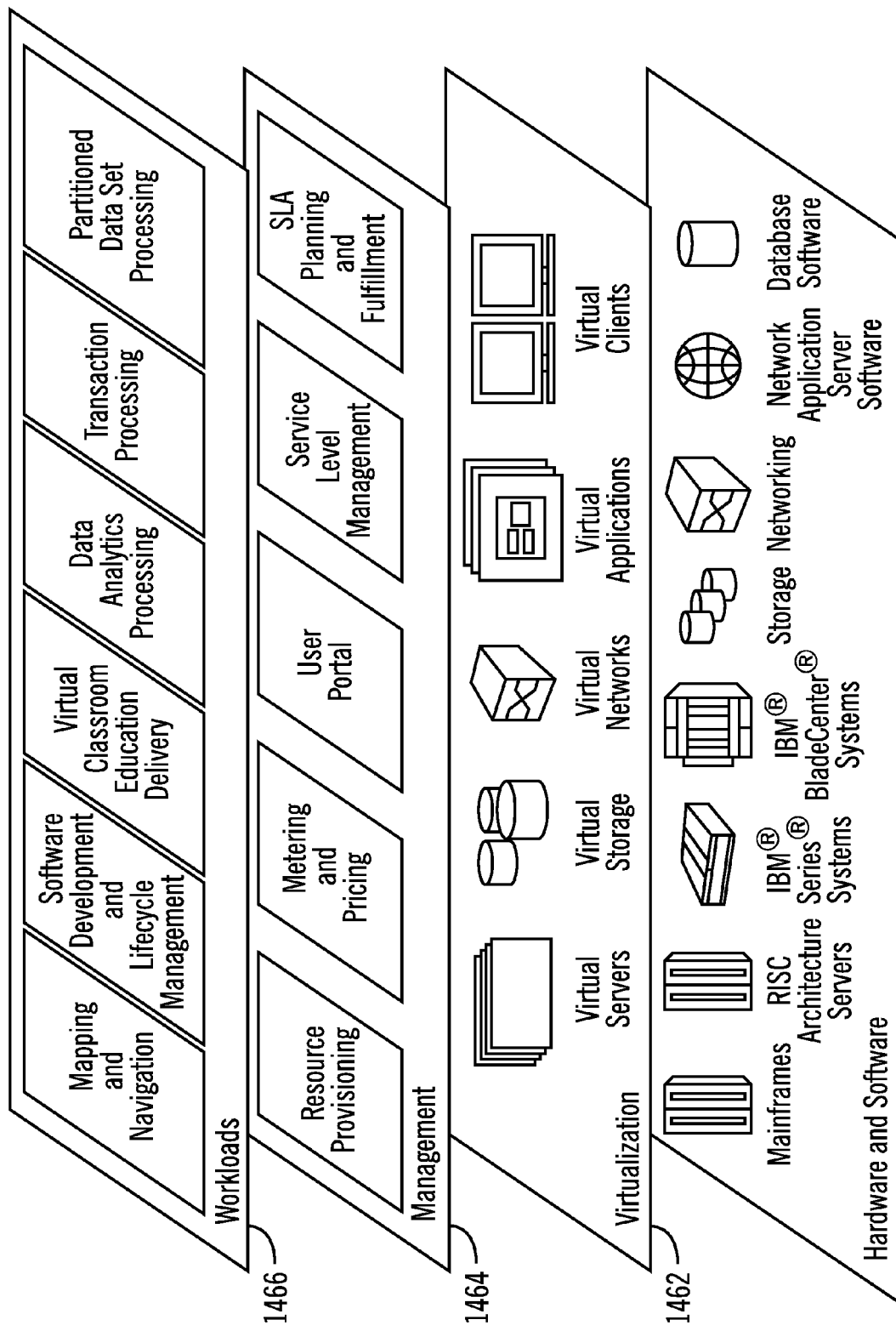
FIG. 14 illustrates abstraction model layers in accordance with certain embodiments.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1462 provides an abstraction layer from which the following examples of virtual entities may be provided: virtual servers; virtual storage; virtual networks, including virtual private networks; virtual applications and operating systems; and virtual clients.

In one example, management layer 1464 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1466 provides examples of functionality for which the cloud computing environment may be utilized. Examples of workloads and functions which may be provided from this layer include: mapping and navigation; software development and lifecycle management; virtual classroom education delivery; data analytics processing; transaction processing; and partitioned data set processing.

Thus, in certain embodiments, software or a program, implementing partitioned data set processing in accordance with embodiments described herein, is provided as a service in a cloud environment.

In certain embodiments, the computing devices 100, 140, 180 have the architecture of computing node 1210. In certain embodiments, the computing devices 100, 140, 180 are part of a cloud environment. In certain alternative embodiments, the computing devices 100, 140, 180 are not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   under control of a producing application,
     generating a partitioned data set;
     generating a descriptor that describes the partitioned data set by indicating a number of partitions in the partitioned data set, whether the partitioned data set is partitioned by one of key partitioning and balanced partitioning, and whether data in the partitioned data set has been sorted; and registering the descriptor in a registry; and
under control of a consuming application,
accessing the registry to obtain the descriptor of the partitioned data set; and
using the descriptor to determine how to process the partitioned data set based on the number of partitions in the partitioned data set, whether the partitioned data set is partitioned by one of key partitioning and balanced partitioning, and whether the data in the partitioned data set has been sorted.

2. The method of claim 1, wherein the descriptor is used to determine that the partitioned data set does not need to be re-partitioned.

3. The method of claim 2, wherein the partitioned data set is partitioned with a first number of partitions, and wherein the consuming application processes a second number of partitions.

4. The method of claim 1, wherein the descriptor is used to determine that the data has been sorted.

5. The method of claim 1, wherein the registry stores a location of the partitioned data set with the descriptor.

6. The method of claim 1, wherein the consuming application accesses the descriptor in the registry using a location and an identifier of the partitioned data set.

7. The method of claim 1, wherein software is provided as a service in a cloud environment.

* * * * *